H. W. EDEN.
PROTECTING BOX FOR ELECTRIC WIRING.
APPLICATION FILED DEC. 16, 1908.

938,373.

Patented Oct. 26, 1909.

Witnesses
Clarence E. Doy
Alecia Townsend.

Inventor
Harold W. Eden
By Parker & Burton
Attorneys

UNITED STATES PATENT OFFICE.

HAROLD W. EDEN, OF DETROIT, MICHIGAN, ASSIGNOR TO P. R. MANUFACTURING COMPANY, OF DETROIT, MICHIGAN, A CORPORATION OF MICHIGAN.

PROTECTING-BOX FOR ELECTRIC WIRING.

938,373.

Specification of Letters Patent.   Patented Oct. 26, 1909.

Application filed December 16, 1908. Serial No. 467,734.

*To all whom it may concern:*

Be it known that I, HAROLD W. EDEN, a citizen of the United States, residing at Detroit, county of Wayne, State of Michigan, have invented a new and useful Improvement in Protecting-Boxes for Electric Wiring, and declare the following to be a full, clear, and exact description of the same, such as will enable others skilled in the art to which it pertains to make and use the same, reference being had to the accompanying drawings, which form a part of this specification.

This invention relates to protecting boxes for electric wiring; it has for its object an improved construction of protecting box, especially adapted for the reception of the ends of pipes where either the pipe itself is bent or some coupling attached to the pipe is larger than that part of the pipe which passes through the wall of the box.

Figure 1:
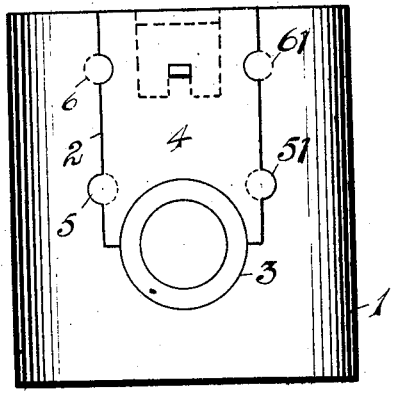
Figure 2:
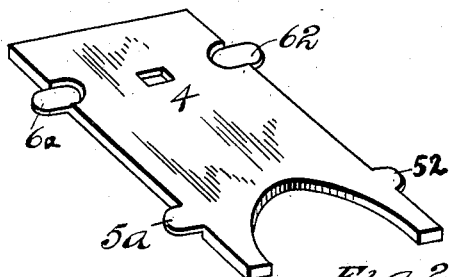
Figure 3:
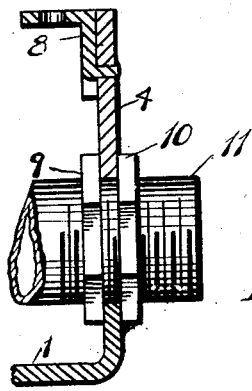
Figure 4:
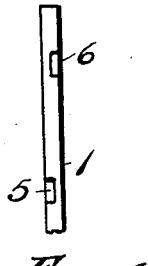

In the drawing:—Figure 1, is an end elevation of the coupling box. Fig. 2, is a perspective of the fillet adapted to fill an opening in the box. Fig. 3, is a sectional elevation of an end of the box, showing a pipe in place therein. Fig. 4, is a side elevation of the edge of the notch.

The box 1, preferably made of an integral piece of metal, shaped and formed as a deep cup, is provided at an end thereof, with a rectangular slot 2, terminating at the bottom with a half round seat 3 for the engagement of the pipe. A fillet 4, rectangular in shape, and provided with a counterpart of the pipe seat, is adapted to fill this opening. In order to hold the fillet in place, the edges of the slot in the box are provided with notches or seats 5 and 6, the seat 5 being on the outside and the seat 6 being on the inside. The fillet is provided with tongue-like projections pressed out from the metal of the fillet and formed into half-round tongues 5ª and 6ª, adapted to engage closely in the seats 5 and 6. Similar notches 51 and 61 on the opposite side of the slot are adapted to engage with tongues 52 and 62 on the opposite side of the fillet. The fillet is placed in the slot with the tongues engaging in the seats which may be easily done by placing the one piece into the other in the angular relation, and swinging the fillet until the tongues are in the proper engagement; the parts are held in place, either by the cover of the box, which engages on a bracket 8, riveted to the fillet, or by washer-like nuts 9 and 10, which run on a thread on the pipe 11 that engages through the seat opening between the fillet and the body of the box. The coaction of the tongues and the seats in which they engage, and either the cover or the pipe, will hold the fillet securely in place. With this fillet, the pipe may be slipped into its seat before the fillet is placed in position, and the fillet placed in position afterward.

What I claim is:—

1. In a protecting box for electric wiring, having in combination a box body having an apertured side wall, suitably spaced portions thereof about the edge of the aperture being partially indented, a fillet of complementary contour to the aperture, adapted to engage therein, complementarily located portions of the edge of the fillet being partially indented and formed into tongues adapted to register with the indented portions of the wall, a conductor pipe entering said box through the aperture and washer nuts adapted to engage on each side of the wall and fillet about said entering conductor pipe, and to hold the fillet in the plane of the adjacent portion of the wall by the engagement thereagainst on each side, substantially as described.

2. In combination with an apertured box body having indented notched portions extending partially through the surrounding edge portions of the box wall and integral tongue portions projecting into the aperture at such points of partial indentation, a fillet adapted to close said aperture, provided with indentations and tongues complementary to and adapted to register with those of the surrounding edge of the box wall, all of said indentations and tongues lying within the plane of the fillet and of the adjacent box wall, and means adapted to coöperate with said indentations and tongues for holding the fillet in position within such plane, substantially as described.

3. In combination with a box body provided with slots extending into said body at one side thereof and with notches along the edge of said slot and on opposite faces of the walls of said box, a fillet provided with projections and partial indentations on its opposite faces adapted to engage in said notches, all of said parts lying in the plane of the fillet and of the adjacent wall of the box body, substantially as described.

In testimony whereof, I sign this specification in the presence of two witnesses.

HAROLD W. EDEN.

Witnesses:
CHARLES F. BURTON,
VIRGINIA C. SPRATT.